US008482806B2

(12) United States Patent
Kaneda

(10) Patent No.: US 8,482,806 B2
(45) Date of Patent: Jul. 9, 2013

(54) DEVICE FOR FORMING A CONNECTED DOCUMENT BY INSERTING A HEAD PAGE HAVING EMBEDDED CERTIFICATION INFORMATION, AND METHOD OF FORMING A CONNECTED DOCUMENT

(75) Inventor: Takeshi Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 874 days.

(21) Appl. No.: 12/272,150

(22) Filed: Nov. 17, 2008

(65) Prior Publication Data

US 2009/0147316 A1 Jun. 11, 2009

(30) Foreign Application Priority Data

Dec. 5, 2007 (JP) ................... 2007-315036

(51) Int. Cl.
*H04N 1/40* (2006.01)
*G06K 15/00* (2006.01)
(52) U.S. Cl.
USPC ......................................... 358/3.28; 358/1.18
(58) Field of Classification Search
None
See application file for complete search history.

(56) References Cited

U.S. PATENT DOCUMENTS

| 7,619,782 B2 | 11/2009 | Mikami |
| 7,697,170 B2 * | 4/2010 | Otake et al. .................. 358/3.28 |
| 2004/0150859 A1 | 8/2004 | Hayashi ........................ 358/3.28 |
| 2005/0036170 A1 * | 2/2005 | Okuoka et al. ............... 358/1.16 |
| 2007/0061889 A1 * | 3/2007 | Sainaney ........................ 726/26 |
| 2007/0133036 A1 * | 6/2007 | Matsunoshita et al. ...... 358/1.14 |
| 2007/0157827 A1 | 7/2007 | Mikami |
| 2008/0163364 A1 * | 7/2008 | Ferlitsch ........................ 726/21 |

FOREIGN PATENT DOCUMENTS

| JP | 2004-223854 | 8/2004 |
| JP | 2005-063099 | 3/2005 |

OTHER PUBLICATIONS

Notification of Second Office Action (English Translation), issued by The State Intellectual Property Office of P.R. China, dated Oct. 9, 2012, in Chinese Application No. 200810178946.1.
Notification of Second Office Action (English Translation), issued by The State Intellectual Property Office of P.R. China, dated Jan. 18, 2012, in Chinese Application No. 200810178946.1.

* cited by examiner

*Primary Examiner* — Ming Hon
(74) *Attorney, Agent, or Firm* — Fitzpatrick, Cella, Harper & Scinto

(57) ABSTRACT

An object of the present invention is for a user originally having authority to be capable of performing a copy operation without damaging convenience. In order to achieve the above object, a device according to the present invention comprises connecting unit for connecting data of a first document into which first certification information to be inputted for permitting a copy of the document is embedded to data of a second document into which second certification information to be inputted for permitting a copy of the document is embedded.

2 Claims, 11 Drawing Sheets

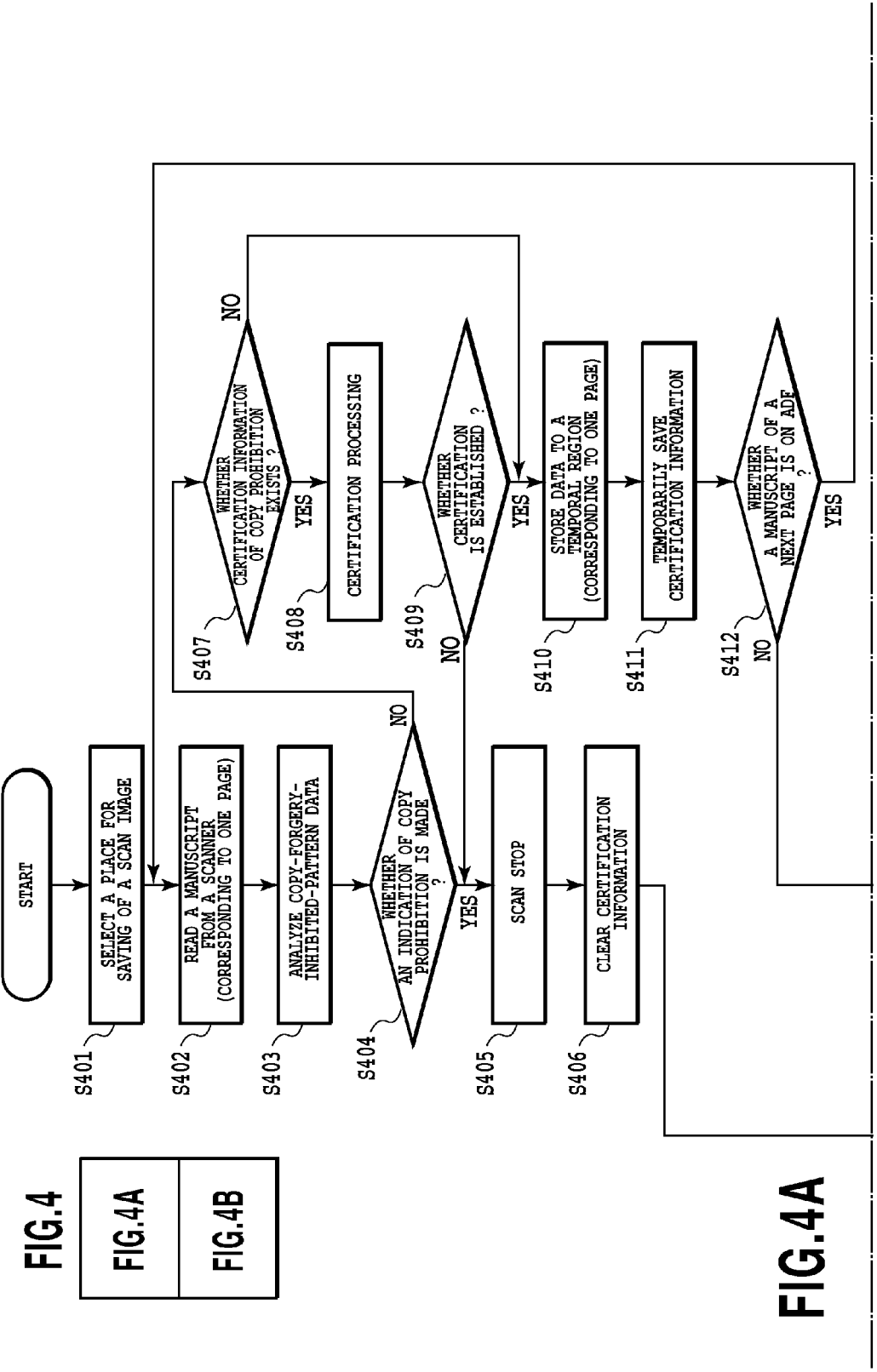

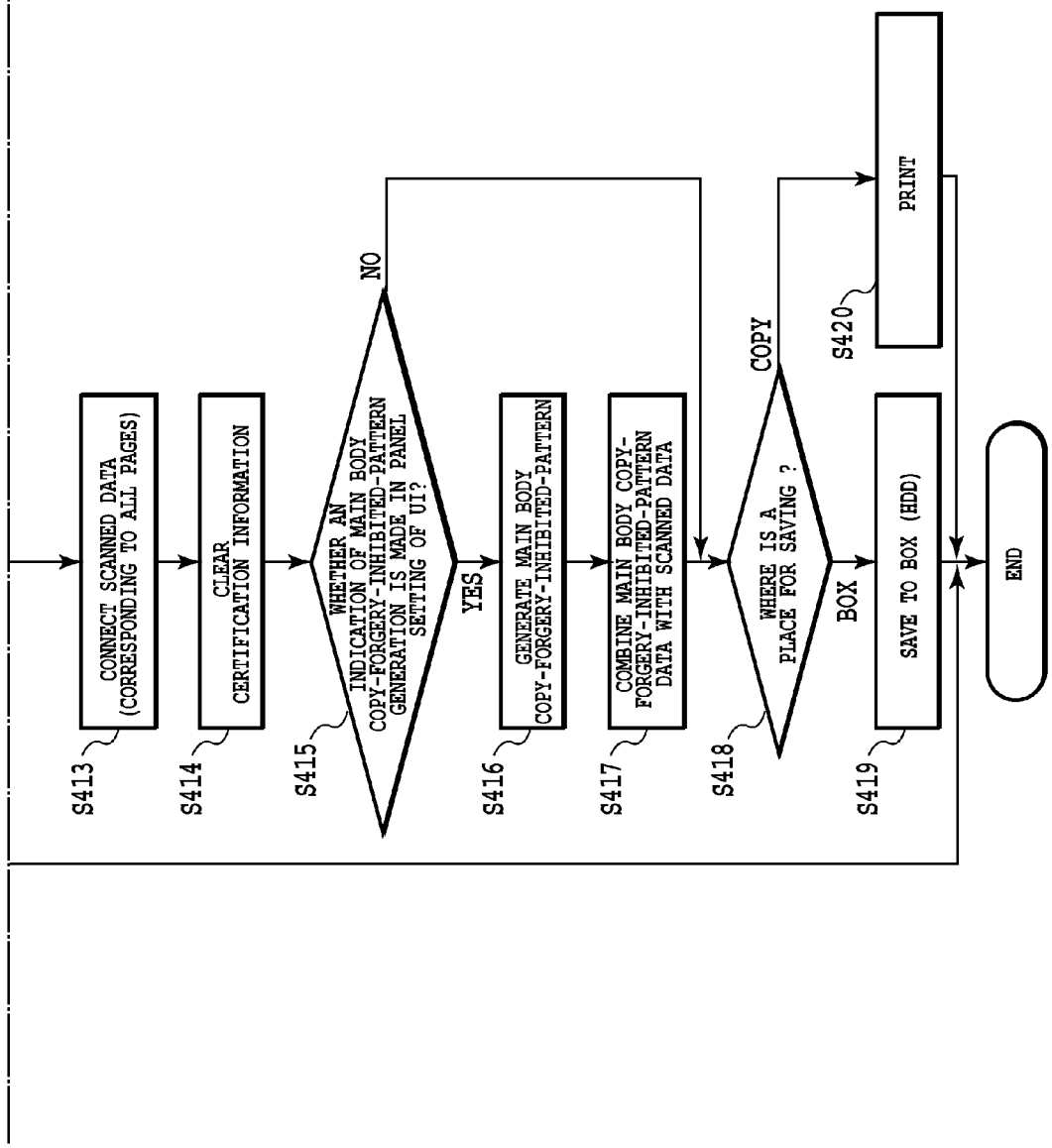

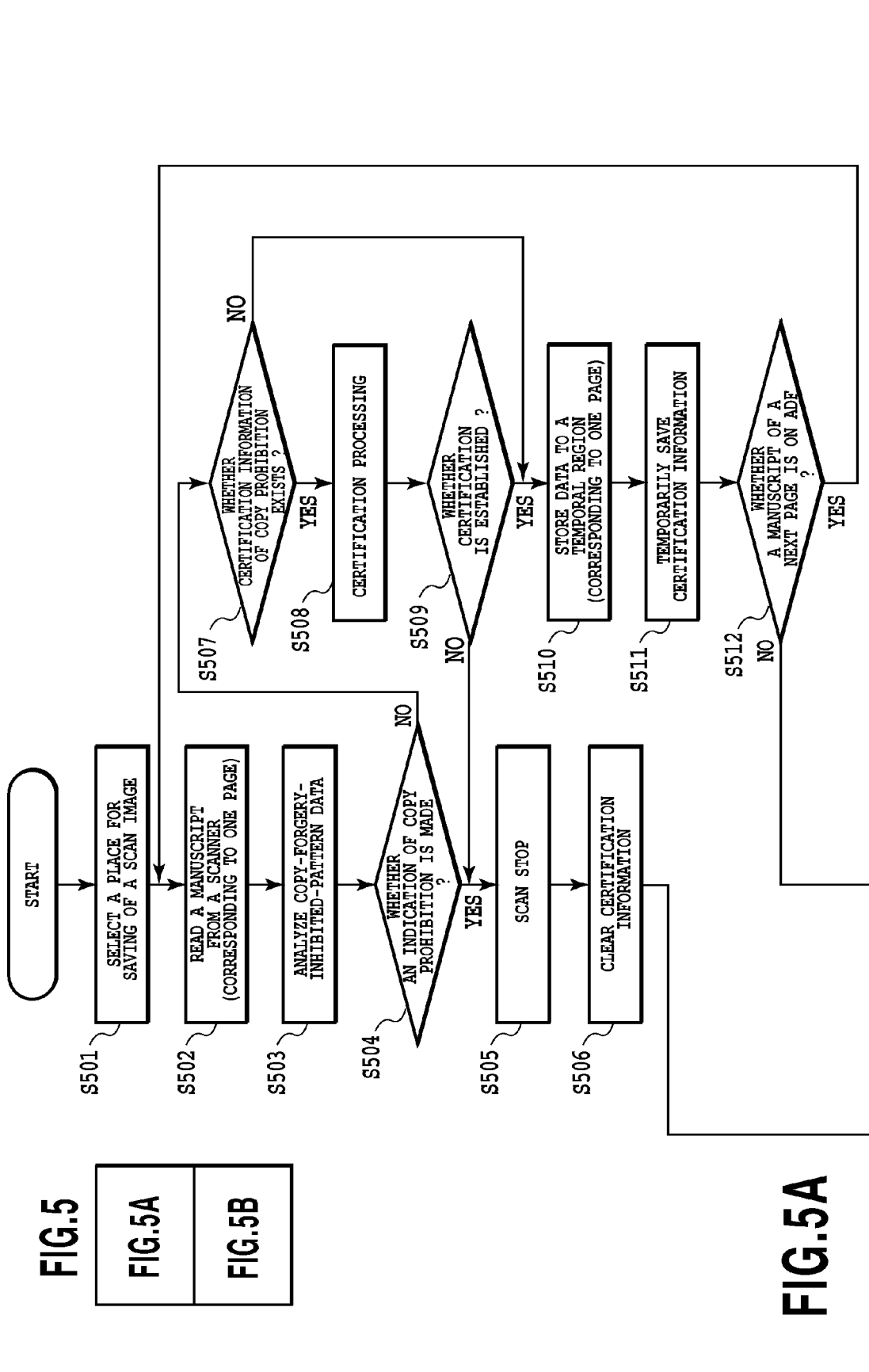

DEVICE FOR FORMING A CONNECTED DOCUMENT BY INSERTING A HEAD PAGE HAVING EMBEDDED CERTIFICATION INFORMATION, AND METHOD OF FORMING A CONNECTED DOCUMENT

BACKGROUND OF THE INVENTION

1. Field of the Invention

This invention relates to a device for connecting data of documents and in particular, to a technology for connecting data of documents including a copy-forgery-inhibited-pattern in regard to security, in an image forming device.

2. Description of the Related Art

An image forming device recently includes a hard disc (HDD) as standard equipment. Therefore, data of a document scanned by a user or data of a document transmitted as PDL print data from a PC or the like are stored in the HDD of the image forming device. In consequence, the user can reprint the document or connect (edit) the documents with each other later. On the other hand, since anybody can save or reprint documents easily, there is growing concern about a risk of information leak and a security function for coping with it. Therefore, in an output matter from the image forming device, there is introduced a system in which at the time of operating the image forming device, for example, copy-forgery-inhibited-pattern data are combined to require a user certification, or a person, time and a device in regard to the document printed are specified so as to be capable of tracing a route of the leak later.

Copy-forgery-inhibited-pattern technologies have become remarkable as security measures against information leak or the like and therefore, even in the image forming device, as in the case of other information equipment, the copy-forgery-inhibited-pattern data is used to embed various pieces of security information into a print document.

As described below, a unit for restricting and preventing an impermissible copy operation using such copy-forgery-inhibited-pattern data are already realized and are generally used by a user.

(1) group and person identification by user names and passwords,
(2) tracing by the embedding of print equipment ID,
(3) tracing by the embedding of print time, and
(4) tracing by the embedding of user name.

As described above, most of the security of printed documents is realized by use of the copy-forgery-inhibited-pattern technology. Therefore, upon editing data of the document, it is also required to consider consistency of the copy-forgery-inhibited-pattern information. When documents including copy-forgery-inhibited-patterns are connected with each other without paying attention to this respect, the security information (copy-forgery-inhibited-pattern content) is changed at a boundary of the connection. In consequence, the convenience for a user may deteriorate or the user may become confused.

For example, in a case where three documents each having certification information with a different name and a different password are saved in an image forming device, a new document produced by connecting the three documents contains three kinds of the certification information, which are supposed to be changed at the boundary of each document.

In a general scan function as a security function, it is confirmed whether or not copy-forgery-inhibited-pattern data in regard to the security are embedded inside the scanned image. When the certification information is found, a print operation after scanning is stopped to require a user to input the certification information. When the certification is established, the printing is started and when the certification is not established, the printing processing is cancelled. In such a security system, in the connected document described above, the printing operation is forced to be stopped at the connection boundary of each document to require a user to carry out the certification processing. Therefore, since the user can not be away from the image forming device until the printing is completed after starting with the printing operation, it is inconvenient for the user.

Therefore, the present invention provides a unit for merging and reproducing the copy-forgery-inhibited-pattern information retained at each page unit upon carrying out the document connection from a plurality of documents. Further, an object of the present invention is for a user originally having authority to be capable of carrying out a copy operation without deteriorated convenience of the copying, while maintaining security similar to that before the connecting.

SUMMARY OF THE INVENTION

The present invention is made in view of the foregoing problem and a device according to the present invention comprises connecting unit for connecting data of a first document into which first certification information to be inputted for permitting a copy of the document is embedded with data of a second document into which second certification information to be inputted for permitting a copy of the document is embedded, wherein the connecting unit, at the connecting, inserts the data of a document into which the first certification information and the second certification information are embedded, as a head page of data in a connected document.

In addition, a device according to the present invention comprises connecting unit for connecting data of a first document requiring input of first information with data of a second document requiring input of second information, wherein the connecting unit, at the connecting, inserts a document requiring both of the input of the first information and the input of the second information, into a head of data in a connected document.

In addition, a device according to the present invention comprises outputting unit for outputting a first page requiring an image forming device to input first information at copying and a second page likewise requiring the image forming device to input second information to the image forming device, wherein the outputting unit outputs one or more pages requiring the input of the first information and the input of the second information before any of the first page and the second page is outputted.

A method according to the present invention comprises a connecting step of connecting data of a first document into which first certification information to be inputted for permitting a copy of the document is embedded with data of a second document into which second certification information to be inputted for permitting a copy of the document is embedded, wherein in the connecting step, at the connecting, a document into which the first certification information and the second certification information are embedded, are inserted as a head page of data in a connected document.

In addition, a method according to the present invention comprises a connecting step of connecting data of a first document requiring input of first information with data of a second document requiring input of second information, wherein in the connecting step, at the connecting, a document requiring both of the input of the first information and the input of the second information is inserted into a head of data in a connected document.

In addition, a method according to the present invention comprises an outputting step of outputting a first page requiring an image forming device to input first information at copying and a second page likewise requiring the image forming device to input second information to the image forming device, wherein in the outputting step, one or more pages requiring the input of the first information and the input of the second information are outputted before any of the first page and the second page is outputted.

It is preferable that the certification information or the first and second information is contained as a copy-forgery-inhibited-pattern in each document.

In addition, the present invention may be constructed as a program of carrying out the above method with a computer. Further, the program may be read in the computer through a memory medium which can read the computer in which the program is recorded.

In addition, a device according to the present invention comprises unit for setting printing so that data of a first document into which first certification information to be inputted for permitting a copy of the document is embedded and data of a second document into which second certification information to be inputted for permitting a copy of the document is embedded are continuously printed, wherein the unit further sets the printing so that a document into which the first certification information and the second certification information are embedded, is printed before the data of the first document and the data of the second document are printed.

In addition, a device according to the present invention comprises setting unit, in a case where data of a first document into which first certification information to be inputted for permitting a copy of the document is embedded and data of a second document into which second certification information to be inputted for permitting a copy of the document is embedded are continuously printed, for setting printing so that a document into which the first certification information and the second certification information are embedded, is printed before the data of the first document and the data of the second document are printed.

In addition, a device according to the present invention comprises combining unit, in a case where data of a first document to be combined with a first image into which first certification information to be inputted for permitting a copy of the document is embedded and data of a second document to be combined with a second image into which second certification information to be inputted for permitting a copy of the document is embedded are continuously printed, for combining a third image to the data of the first document and the data of the second document in place of the first image and the second image, wherein the first certification information and the second certification information are embedded in the third image.

In addition, a device comprises combining unit, in a case where data of a first document to be combined with a first image into which first certification information to be inputted for permitting a copy of the document is embedded and data of a second document to be combined with a second image into which second certification information to be inputted for permitting a copy of the document is embedded are continuously printed, for combining a third image to the data of the first document and the data of the second document in place of the first image and the second image, wherein third certification information in place of the first certification information and the second certification information is embedded in the third image.

According to the present invention, also in the connected document connecting data of a plurality of documents containing predetermined information such as copy-forgery-inhibited-pattern data relating to the security, convenience similar to that of the conventional device can be maintained in operability at copying.

Further features of the present invention will become apparent from the following description of exemplary embodiments (with reference to the attached drawings).

BRIEF DESCRIPTION OF THE DRAWINGS

FIG. 4 is a diagram showing the relationship of FIGS. 4A and 4B;

FIG. 4A is a flow chart showing the process flow of a ScanToBox (HDD) and a COPY in a copy-forgery-inhibited-pattern/print layer separation system;

FIG. 4B is a flow chart showing the process flow of a ScanToBox (HDD) and a COPY in a copy-forgery-inhibited-pattern/print layer separation system;

FIG. 5 is a diagram showing the relationship of FIGS. 5A and 5B;

FIG. 5A is a flow chart showing the process flow of a ScanToBox (HDD) and a COPY in a copy-forgery-inhibited-pattern/print layer unifying system;

DESCRIPTION OF THE EMBODIMENTS

Brief Summary

Figure 1:
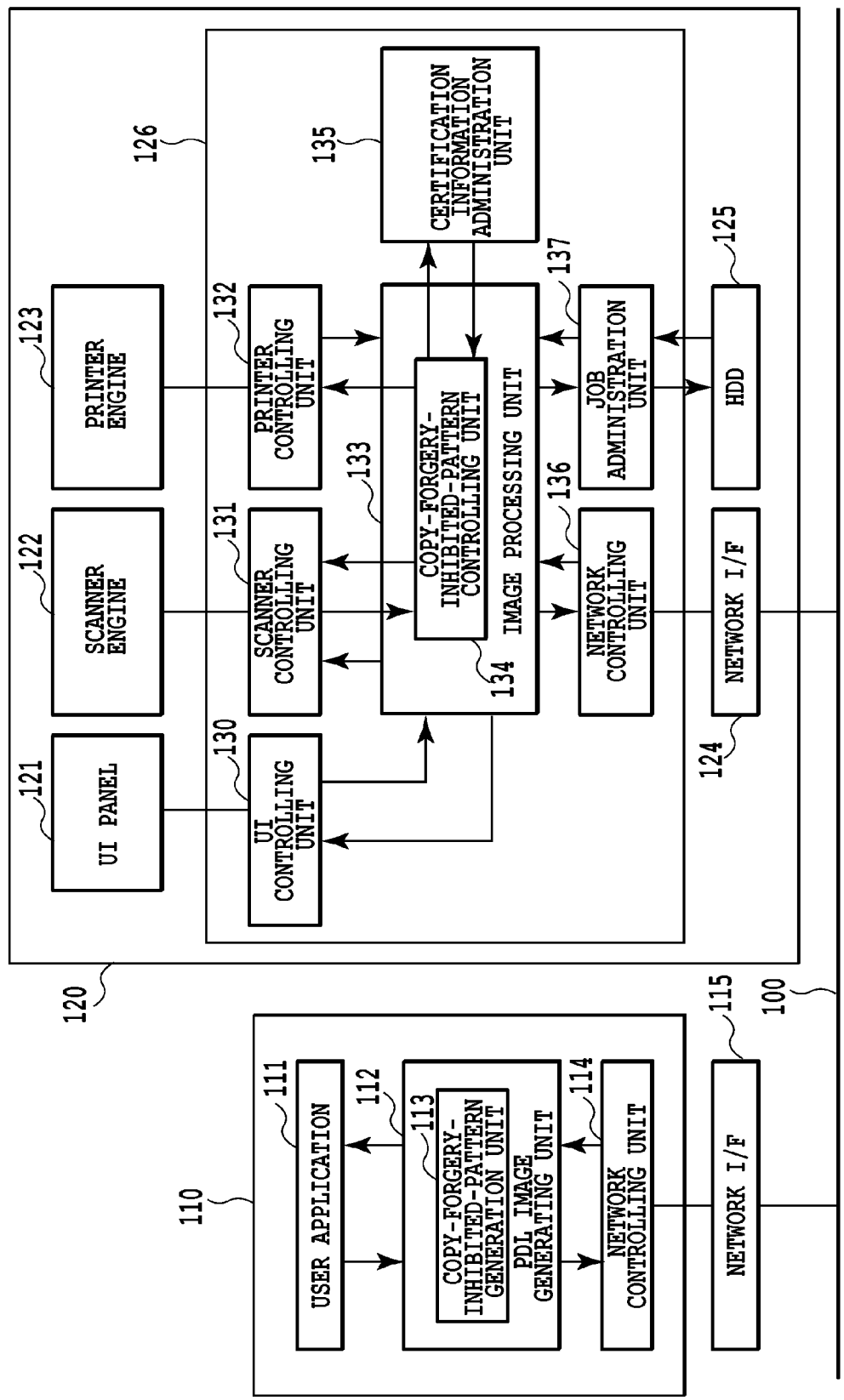
FIG. 1 is a module construction diagram of a PDL print client and an image forming device.

At present, there exist two kinds of types in regard to copy-forgery-inhibited-pattern data to be generated. One is a type in which the copy-forgery-inhibited-pattern data is contained in printout data itself of a document, and the copy-forgery-inhibited-pattern data and the printout data are saved at a combined state thereof in a HDD of an image forming device (type 1). The other is a type in which the printout data and the copy-forgery-inhibited-pattern data are separated, which are saved in different layers (type 2).

In a case of containing the copy-forgery-inhibited-pattern data in the printout data itself (type 1), the copy-forgery-inhibited-pattern data are extracted from each printout data containing the copy-forgery-inhibited-pattern data before the image forming device connects data of the respective documents and a front page is inserted into a head of a connected document. It should be noted that in the present embodiment, "connection" indicates that data (file) of a plurality of documents are made to data (file) of a single document or that data of a plurality of documents are related with each other so that the data of the plurality of the documents can be printed in one bunch. Or it indicates that printing is set so that a plurality of documents are continuously printed (for example, as described above, data of a plurality of documents are related with each other or data of a plurality of documents are made to data of a single document. "connection" indicates that a plurality of jobs are made to a single job or a plurality of jobs are related with each other to continuously carry out the plurality of the jobs. In addition, "connection time" (at connecting) is a concept which may include "after connecting" or "before connecting". Upon printing this front page, all the extracted copy-forgery-inhibited-pattern information is printed out. Therefore, at copying, in a stage where the image forming device scans the head front page, all the certification information required for the copying can be detected. For example, in a case where three pieces of certification information are contained in a document produced by connecting a first document (first page), a second document (second page) and a third document (third page), the certification screen is displayed three times after scanning the head page and all the certification can be processed altogether. Each certification information (first certification information (first information), second certification information (second information) and third certification information (third information)) on the subsequent page is the same as that of the head page and therefore, the confirmation (certification processing) can be omitted.

Next, in a case of the type where printout data and copy-forgery-inhibited-pattern data are separately saved (type 2), even if the copy-forgery-inhibited-pattern data are rewritten, it does not affect the printout data (not degraded). Therefore, the security information corresponding to all pages can be updated at the timing of connecting data of the documents. There are two update methods. One is, as in the case of type 1, a method in which the certification information existing in the data of the connected document is merged and the merged certification information is reset to all the pages. For example, in a case of connecting data of three documents with this method, one piece of the certification information (first certification information, second certification information or third certification information) has been set to each page, but three pieces of the first certification information, the second certification information and the third certification information are set to each page. The other is a method in which upon merging the certification information, a user carries out each certification of three documents on a UI screen. When the certification is confirmed, registration of new certification information is prompted to a user. When the user registers the fourth certification, the copy-forgery-inhibited-pattern layer of the entire connected document is rewritten by the fourth certification information.

According to the above methods, in a case of connecting data of documents in the image forming device with the security function using the copy-forgery-inhibited-pattern, the connection processing specific to the copy-forgery-inhibited-pattern is provided to copy-forgery-inhibited-pattern information, thereby making it possible to secure the convenience similar to that of the conventional device.

First Embodiment

Embodiments of the present invention will explained with reference to the drawings.

First, a schematic construction of each of an image forming device and a print client for inputting print jobs to the image forming device will be explained.

FIG. 1 is a block diagram showing the schematic construction of each device.

A print client 110 and an image forming device 120 are connected through a network 100 by Ethernet and the print client 110 and the image forming device 120 are communicated with each other by TCP/IP.

The print client 110 is constructed of a user application 111, a PDL image generating unit 112, a copy-forgery-inhibited-pattern generation unit 113, a network controlling unit 114 and a network I/F 115.

The user application 111 is an application which a user installs as needed and can generate various print data (including printout data of a document, various setting information and the like) according to the setting by the user. The PDL image generating unit 112 carries out the processing of converting print data generated by the user application 111 into PDL print data of a PDL format receivable at the image forming device 120. In addition, the PDL image generating unit 112, in a case where an addition of the copy-forgery-inhibited-pattern information is commanded from the user application 111, requests the copy-forgery-inhibited-pattern generation unit 113 for production of the copy-forgery-inhibited-pattern data. At this time, in a case where the image forming device 120 has capabilities of retaining the printout data and the copy-forgery-inhibited-pattern data as different layers, PDL print data are generated as jobs having two print layers. The generated PDL print data are transferred through the network controlling unit 114 to the image forming device 120.

The image forming device 120 is constructed of respective units and devices as described below. A UI controlling unit 130 in a controller 126 performs control of a UI panel 121 which is a user interface. A scanner controlling unit 131 performs control of scan start/scan stop to a scanner engine 122 and executes transfer processing of a scan image. A printer controlling unit 132 executes processing of transferring printout data received from an image processing unit 133 to a printer engine 123. A network controlling unit 136 receives data on a network through a network I/F 124 and at the same time, transfers the received data to the image processing unit 133. It should be noted that as shown in FIG. 1, the respective controlling units 130, 131, 132 and 136 are connected respectively to the UI panel 121, the scanner engine 122, the printer engine 123 and the network I/F 124.

The image processing unit 133, as one processing, performs the processing of developing PDL print data transferred from the print client 110, converting it into data representing a document image and providing the data to the printer controlling unit 132 (PDL printing). In addition, the image processing unit 133, as the other processing, performs the processing of providing a scan image provided from the scanner controlling unit 131 to the printer controlling unit 132 (COPY). Further, the image processing unit 133 performs COPY to BOX processing of storing the scan image in the HDD and PDL to BOX processing of storing the PDL print data in the HDD.

A copy-forgery-inhibited-pattern controlling unit 134 performs generation of copy-forgery-inhibited-pattern information to be combined to a manuscript which does not contain copy-forgery-inhibited-pattern data, analysis of certification information in a manuscript containing copy-forgery-inhibited-pattern data and an inquiry of certification information to a certification information administration unit 135. At connecting the saved documents (at the time of the connection), the copy-forgery-inhibited-pattern controlling unit 134 performs the reproduction processing of copy-forgery-inhibited-pattern information for a front page or the reproduction processing of a copy-forgery-inhibited-pattern layer for two-layer format.

A certification information administration unit 135, in a case of scanning a manuscript containing copy-forgery-inhibited-pattern data, receives certification information contained in each page from the copy-forgery-inhibited-pattern controlling unit 134 and retains the certification information therein until the corresponding job is completed.

A job administration unit 137, during performing each processing of the PDL processing, the COPY processing, the PDL to BOX processing and the SCAN to BOX processing, controls the each processing as a PDL job, a COPY job, a BOX storage job and the like inside the device. In addition, the job administration unit 137 records data of the BOX storage job in the HDD 125 in a hierarchical fashion.

Figure 2:
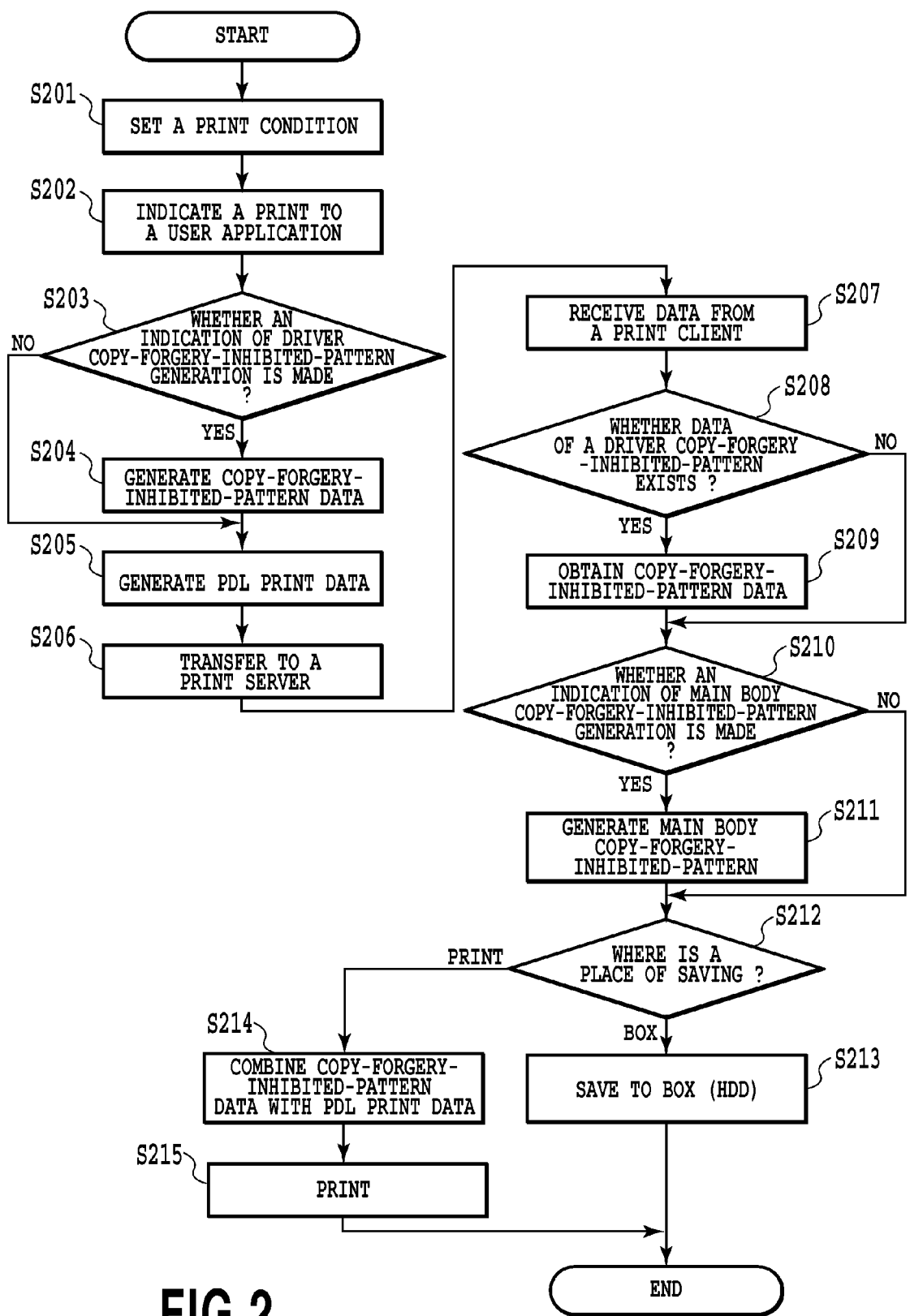
FIG. 2 is a flow chart showing the process flow of a PDL-ToBox (HDD) and a PDL print in a copy-forgery-inhibited-pattern/print layer separation system.

Next, by referring to FIG. 2, there will be explained, in an image forming device of a system for separating the printout data from the copy-forgery-inhibited-pattern data and processing and storing them, the process flow from a point where the print client 110 provides a print job to the image forming device 120 until a point where the printing or the saving to the HDD is carried out. It should be noted that in FIG. 2, S201 to S206 show the processing of the side in the print client 110 and S207 to S215 show the processing of the side in the image forming device.

First, at S201, a user operating the print client 110 sets the print condition. Here, a user makes an indication on where to output data in accordance with the purpose such as printing to a paper medium or saving to the HDD 125 in the image forming device 120 or makes setting of print parameters such as ON/OFF of copy-forgery-inhibited-pattern generation in a driver side of the print client and ON/OFF of copy-forgery-inhibited-pattern generation in the image forming device side.

Next, at S202, a user carries out a print indication to the application 111 (user application) on the print client 110 according to the condition set at S201. The application 111 generates print data according to the indication.

Next, at S203, the application 111 determines whether or not a copy-forgery-inhibited-pattern data generation indication in the driver side exists in the print setting by a user. In a case where the copy-forgery-inhibited-pattern data generation indication in the driver side exists, at S204 the application 111 performs the generation processing of the copy-forgery-inhibited-pattern data at the driver side (driver copy-forgery-inhibited-pattern) by outputting the indication to the driver side. On the other hand, in a case of no copy-forgery-inhibited-pattern data generation indication in the driver side, the process goes to S205.

Next, at S205, a driver carries out generation of the PDL print data based upon an indication from the application 111. In addition, at S206 the generated PDL print data is transferred via the network 100 to the image forming device 120.

Next, at S207 the image forming device 120 receives the PDL print data from the print client 110.

At S208, it is determined whether or not the copy-forgery-inhibited-pattern data generated at the driver side (driver copy-forgery-inhibited-pattern) is contained as a different layer in the PDL print data received in the image forming device 120. When the copy-forgery-inhibited-pattern data is contained, the process goes to S209, wherein the copy-forgery-inhibited-pattern data is obtained to be retained in a different region. On the other hand, when the copy-forgery-inhibited-pattern data is not contained, the process goes to S210 as it is.

At S210, it is determined whether or not the copy-forgery-inhibited-pattern generation at the image forming device side is indicated from the print client 110. Here, when the copy-forgery-inhibited-pattern generation at the image forming device side is indicated, the process goes to S211, wherein the generation of the copy-forgery-inhibited-pattern data (main body copy-forgery-inhibited-pattern) is performed. On the other hand, when the copy-forgery-inhibited-pattern generation at the image forming device side is not indicated, the process goes to S212 as it is, wherein the determination on the output method (place for the saving) is made.

At S212, the determination on whether to perform the saving to the HDD or the printout to a paper medium is made. Here, when the saving to the HDD is determined, the following processing is carried out at S213. That is, three layers which are a sum of a layer of the driver copy-forgery-inhibited-pattern generated at the driver of the print client side, a layer of the main body copy-forgery-inhibited-pattern generated at the image forming device side and a layer of the printout data are saved as one sheet of a page. On the other hand, when the printout to the paper medium is determined, at S214 the printing is carried out by combining the copy-forgery-inhibited-pattern data and the printout data to one sheet of the image at a final stage.

Figure 3:
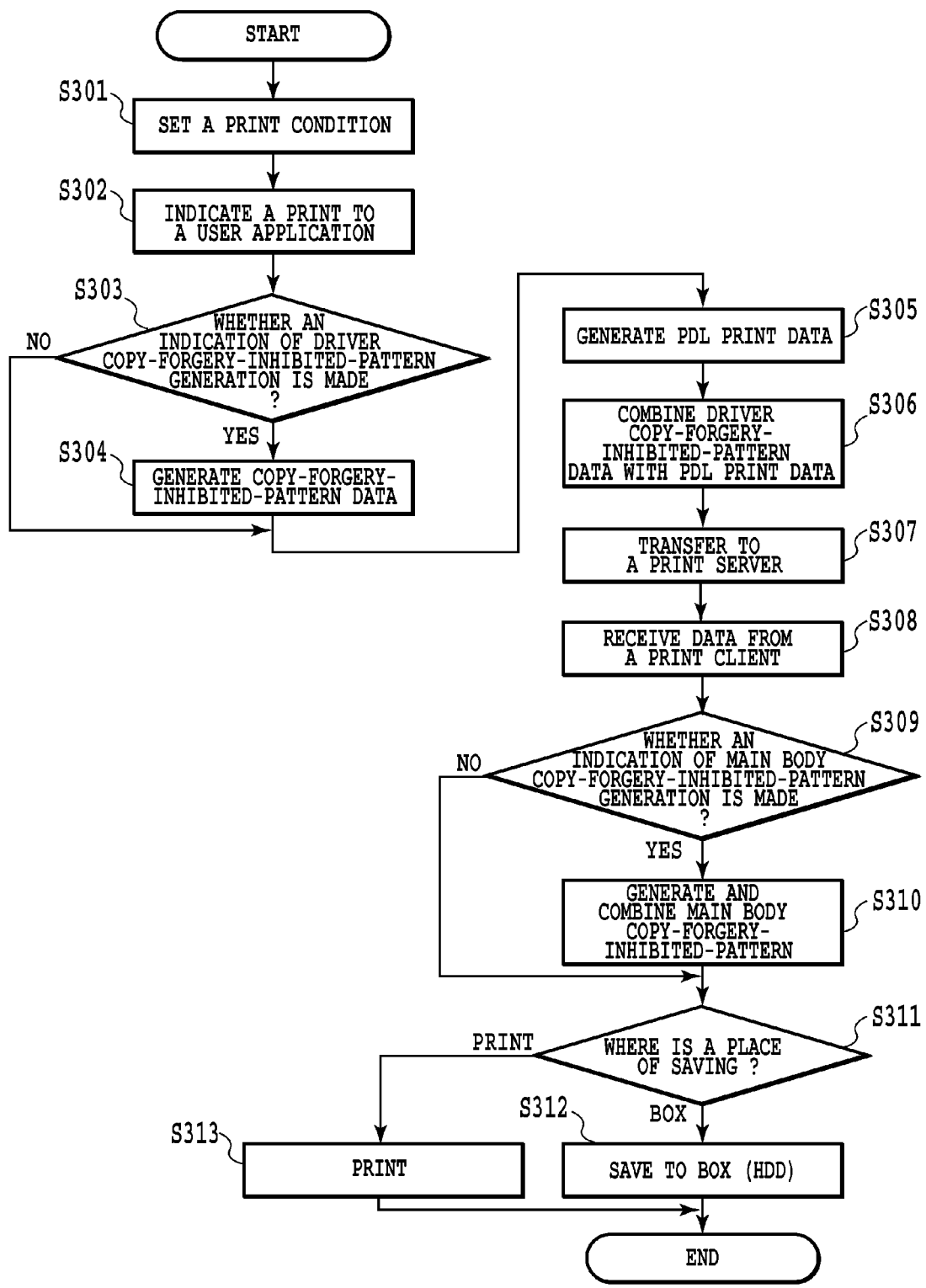
FIG. 3 is a flow chart showing the process flow of a PDL-ToBox (HDD) and a PDL print in a copy-forgery-inhibited-pattern/print layer unifying system.

Next, by referring to FIG. 3, there will be explained, in an image forming device of a system for processing and storing printout data and copy-forgery-inhibited-pattern data without separating them, the process flow from a point where a print job is provided to the image forming device 120 from the print client 110 until a point where the printing or the saving to the HDD is made. It should be noted that in FIG. 3, S301 to S307 show the processing of the side in the print client and S308 to S313 show the processing of the side in the image forming device.

First, at S301, a user operating the print client 110 sets the print condition. Here, a user makes an indication on where to output data in accordance with the purpose such as printing to a paper medium or saving to the HDD 125 in the image forming device 120 or setting of print parameters such as ON/OFF of copy-forgery-inhibited-pattern generation in a driver side of the print client and ON/OFF of copy-forgery-inhibited-pattern generation in the image forming device side.

Next, at S302, a user makes a print indication to the application 111 on the print client 110 according to the condition set at S301. The application 111 generates print data according to the indication.

Next, at S303, the application 111 determines whether or not a copy-forgery-inhibited-pattern data generation indication in the driver side exists in the print setting by a user. In a case where the copy-forgery-inhibited-pattern data generation indication in the driver side exists, at S304 the application 111 performs the generation processing of the copy-forgery-inhibited-pattern data at the driver side (driver copy-forgery-inhibited-pattern) by making the indication to the driver side. On the other hand, in a case of no copy-forgery-inhibited-pattern data generation indication in the driver side, the process goes to S305.

Next, at S305, the driver carries out generation of the PDL print data based upon the indication from the application 111 and at S306, the combination processing of the generated copy-forgery-inhibited-pattern data and the PDL print data is carried out. In addition, at S307 the combined PDL print data is transferred via the network 100 to the image forming device 120.

Next, at S308 the image forming device 120 receives the PDL print data from the print client 110.

At S308, it is determined whether or not generation of the copy-forgery-inhibited-pattern data (main body copy-forgery-inhibited-pattern) at the image forming device side is indicated from the print client 110 in the image forming device 120. When the generation of the copy-forgery-inhibited-pattern data at the image forming device side is indicated, the process goes to S310, wherein the generation of the copy-forgery-inhibited-pattern data (main body copy-forgery-inhibited-pattern) is performed and the generated main body copy-forgery-inhibited-pattern is combined to the print-out data. On the other hand, when the copy-forgery-inhibited-pattern generation at the image forming device side is not indicated, the process goes to S311 as it is, wherein the determination on whether to make the saving to the HDD or the printout to a paper medium as the place for the saving is made. Here, when the saving to the HDD is determined, the process goes to S312, wherein the PDL print data containing the copy-forgery-inhibited-pattern data is stored in the HDD. On the other hand, when the printing to the paper medium is determined, the process goes to S313, wherein the print processing is carried out.

Next, by referring to FIGS. 4 and 5, there will be explained the processing of expanding the conventional copy function and saving data of a document read by the scanner in the HDD.

FIG. 4 is the process flow of a system where copy-forgery-inhibited-pattern data and printout data are combined into one layer, which is saved in the HDD. FIG. 5 is the process flow of a system where copy-forgery-inhibited-pattern data and printout data are saved in different layers and at printing, the two layers are processed to be integrated.

In addition, in the present embodiment, a complex machine with a copy guard function is assumed and the certification processing by the copy guard function is carried out during scanning (S404 to S412 and S504 to S512).

Figure 5B:
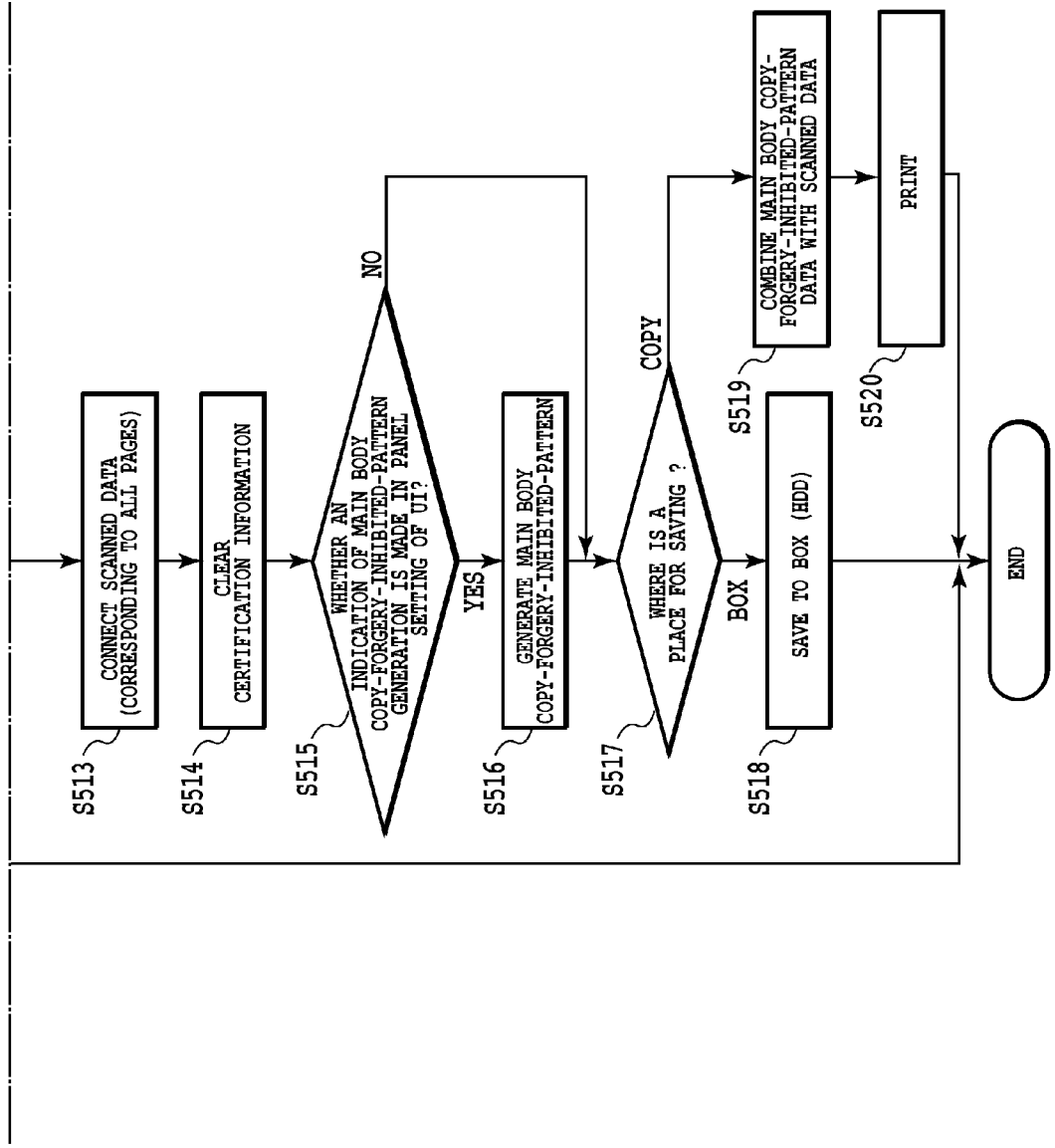
FIG. 5B is a flow chart showing the process flow of a ScanToBox (HDD) and a COPY in a copy-forgery-inhibited-pattern/print layer unifying system.

Here, first, FIG. 4 is used to explain the processing where copy-forgery-inhibited-pattern data and printout data are combined into one layer, and FIG. 5 is used to explain a difference from FIG. 4 in regard to a system where at printing, the above two layers are processed to be integrated thereafter.

First, a user selects use of "a copy function" of printing the image obtained by scanning at S401 or use of "a BOX function" of saving it in the HDD 125 of the image forming device 120 (selection of place for the saving).

Next, when a user sets a scan manuscript on a manuscript table (ADF) and presses down a copy start button of the UI panel 121, the process goes to S402, wherein the scanner reads the manuscript. It is checked at S403 whether or not the copy-forgery-inhibited-pattern data is contained in the image data of the read image. When the copy-forgery-inhibited-pattern data is contained, the copy-forgery-inhibited-pattern data is analyzed to extract the information. Here, the copy-forgery-inhibited-pattern data is designed to include information of indicating copy prohibition or certification information of copy prohibition and further, include document information specifying the corresponding document.

Next, when the copy-forgery-inhibited-pattern data is contained in the image data, it is determined at S404 whether or not an indication of the copy prohibition is made in the copy-forgery-inhibited-pattern data. When it is determined that the indication of the copy prohibition is made, the process goes to S405, wherein the scan stop processing is carried out to stop the reading processing to the next page and also at S406, the certification information related to the above document information recorded in the certification information administration unit 135 is cleared.

On the other hand, when it is determined at S404 that the indication of the copy prohibition is not made in the copy-forgery-inhibited-pattern data, the process goes to S407, wherein it is determined whether or not the certification information of the copy prohibition exists. When it is determined that the certification information of the copy prohibition exists, the certification processing is carried out at S408 (user certification). The user certification herein is to display on the UI screen a user name contained as the certification information in the copy-forgery-inhibited-pattern data and to request a user for input of a password retained in the copy-forgery-inhibited-pattern data as a pair to the user name. After inputting the password, the determination on the user certification is made at S409. In a case where the user certification is established by this determination, the process goes to S410, wherein the subsequent processing continues to be carried out (to be described later). On the other hand, in a case where the user certification is not established by this determination, the process goes to S405, wherein the scan operation is cancelled and the processing is stopped.

At S410, the scan data is copied to a temporal save region and at S411, the certification information inputted by the user is temporarily saved in the certification information administration unit 135. The user name and the password saved as the certification information are saved in the certification information administration unit 135 until the scan processing as the corresponding job is completed. Therefore, in a case where all the pages of the scanned document are subject to copy restriction with the same password, if the certification is carried out in the head page, the image processing unit 133, the copy-forgery-inhibited-pattern controlling unit 134 and the certification information administration unit 135 are cooperated in the subsequent certification, making it possible to automatically carry out check of the certification information in the subsequent pages. Therefore, a user is not required to perform an operation for the certification processing in the subsequent pages. However, in a case where the certification information is changed in the midst of the page, the certification is needed at the boundary.

In a case where a manuscript of the next page is on the manuscript table (ADF), the process goes back to S402, wherein the process is back to the scan processing. When the manuscript on the manuscript table (ADF) is all scanned at S412, the process goes to S413, wherein the scanned data retained in the temporal region are put together, which are integrated into one data.

At S414, the certification information administration unit 135 deletes the above certification information temporarily retained, and the process goes to S415. At S415, the setting in the image forming device side is confirmed on whether the copy-forgery-inhibited-pattern data (main body copy-forgery-inhibited-pattern) is generated at the image forming device side as the setting of the image forming device side. Here, the information contained in the copy-forgery-inhibited-pattern data is used to specify a device, time, a user and the like when a scan operation is performed. When the above setting is effective, the process goes to S416, wherein the copy-forgery-inhibited-pattern data (main body copy-forgery-inhibited-pattern) is generated at the image forming device side, and at S417, the combination processing of the scanned image and the generated main body copy-forgery-inhibited-pattern is carried out.

In a case where it is determined at S415 that the copy-forgery-inhibited-pattern generation at the image forming device side is ineffective, the process goes to S418. At S418, it is confirmed whether the place for the saving is a copy operation or a BOX saving set at S401. In a case of the BOX saving, the process goes to S419, wherein the data is saved in the HDD. On the other hand, in a case of the copy operation, the process goes to S420, wherein the printing to the paper medium is carried out.

As described above, in the flow from S401 to S419, the scanned data with which the copy-forgery-inhibited-pattern data is combined is stored in the HDD 125 of the image forming device 120.

Next, the processing of a system of integrating two layers at printing will be explained. A difference between FIG. 5 showing this processing and FIG. 4 is as follows.

One is a point where the setting inside the image forming device is confirmed at S515 on whether the copy-forgery-inhibited-pattern data is generated at the image forming device side and thereafter, in a case of generating the copy-forgery-inhibited-pattern data at the image forming device side, the determination processing on the place for the saving at S517 is carried out without carrying out the combination processing of the generated copy-forgery-inhibited-pattern data and the scanned data.

Second is a point where in a case where it is determined that the data is saved in the BOX (HDD), the printout data and the copy-forgery-inhibited-pattern data are saved in a separated state at S518.

Third is a point where in a case of printing the scanned data at S520 or in a case where the data are saved in the BOX at S518 and thereafter, selected and printed, the printout data and the copy-forgery-inhibited-pattern data are combined immediately before the printing, which then is printed.

In this way, by introducing the system of combining the copy-forgery-inhibited-pattern data with the printout data immediately before the printing, it is possible to add and edit the content of the copy-forgery-inhibited-pattern data until immediately before the printing.

Figures 6, 6A, 6B:
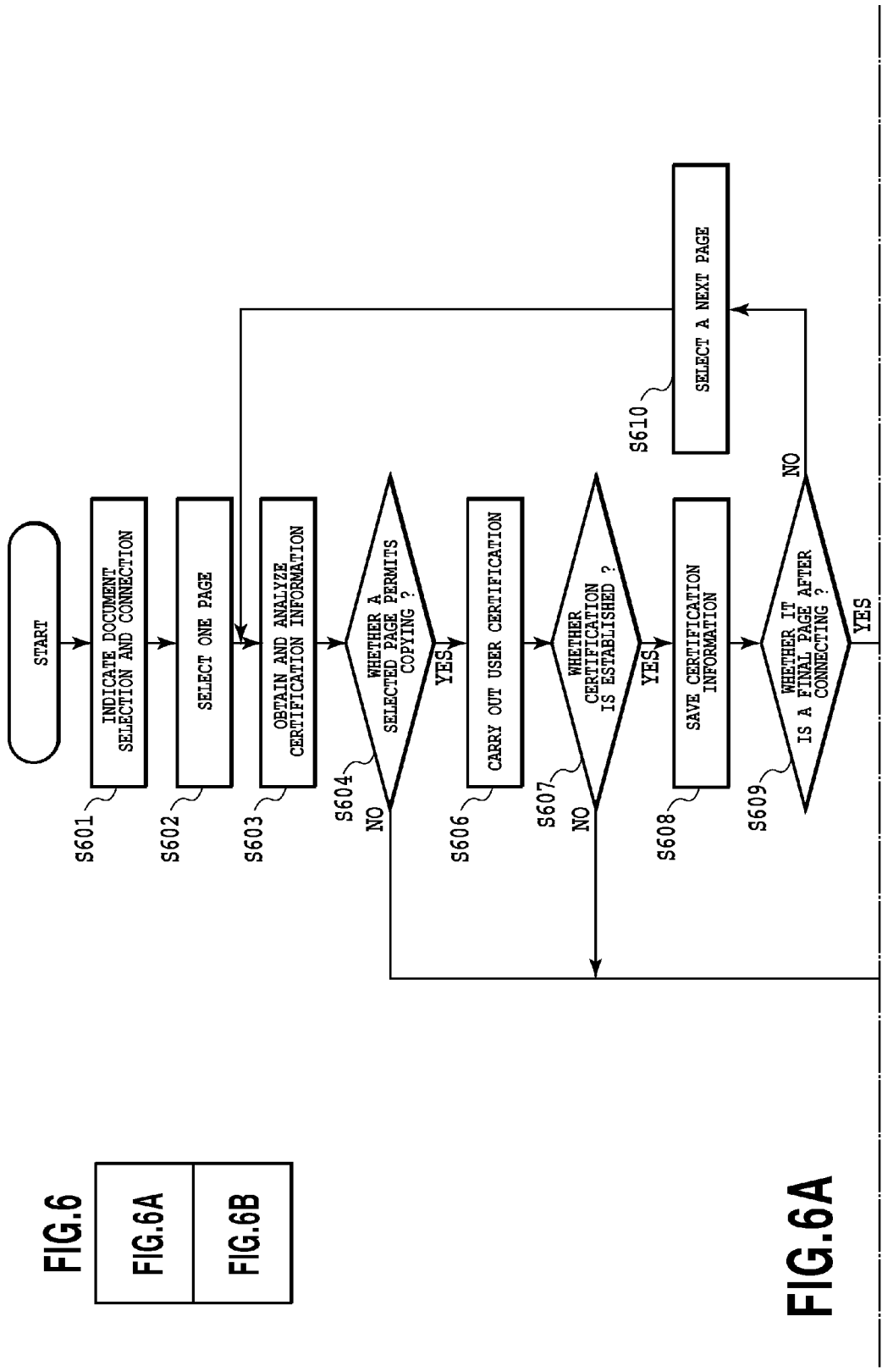
FIG. 6 is a diagram showing the relationship of FIGS. 6A and 6B.
FIG. 6A is a flow chart showing the certification information (copy-forgery-inhibited-pattern generation) process flow at the time of connecting documents.
FIG. 6B is a flow chart showing the certification information (copy-forgery-inhibited-pattern generation) process flow at the time of connecting documents.
Figure 6B:
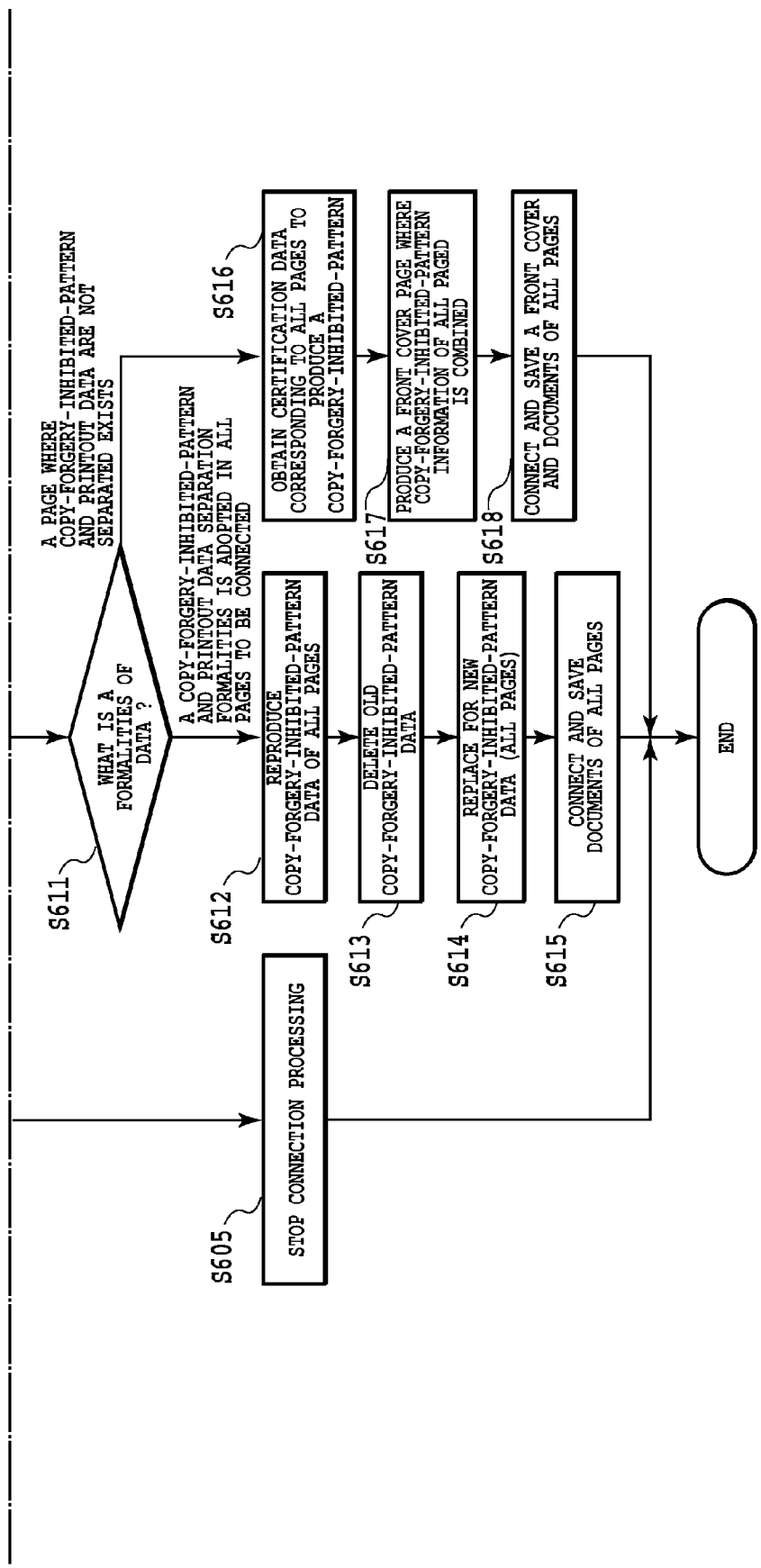

Next, by referring to FIG. 6, there will be explained the processing in a case of connecting data of documents saved in the HDD by input of a scan job or a print job. FIG. 6 shows the process flow. As shown below, scanned data in a scan job, and printout data and copy-forgery-inhibited-pattern data in a print job are called data of a document without distinction.

First, at S601, a user selects the document saved in the HDD 125 from the UI screen of the image forming device 120 and indicates the connection processing.

Next, at S602, the image forming device 120 lays out the documents indicated by the user in order and selects one page of the head.

Next, at S603, the certification information is obtained from the copy-forgery-inhibited-pattern data of the selected page and is then analyzed.

At S604, it is determined whether or not the analyzed page permits the copy processing (copy). When the copy processing is not permitted, the process goes to S605, wherein the connection processing is stopped and also a warning is displayed on the UI screen. On the other hand, when the copy processing is permitted, the process goes to S606 and the subsequent steps.

In a case where the user certification processing is required for the copy processing, at S606 input of a password corresponding to a user name of the certification information contained in the copy-forgery-inhibited-pattern data is prompted through the UI screen.

Next, it is confirmed at S607 whether or not the password inputted by a user is matched with the password recorded corresponding to the copy-forgery-inhibited-pattern. When the password is matched, the process goes to S608. When the certification is not established, the connection processing is stopped at S605 and the flow ends.

At S608, the user name and the password of which the certification is established at S607 are temporarily retained at the certification information administration unit 135. In the certification processing of the subsequent page, in a case where the certification processing is solved by the certification information stored in the certification information administration unit 135, the user certification processing at S606 is omitted.

Next, at S609 it is determined whether or not the page at present processed is a final page. When it is the final page, the process goes to S611. On the other hand, when the next page exists, the next page is selected at S610 and the process goes back to S603.

After the certification information of all the pages in the connection object is confirmed, the process goes to S611, wherein it is determined whether or not data of documents to be connected this time are separated into copy-forgery-inhibited-pattern data and printout data (confirmation of a system). If there exists even one of the documents which is not separated into the copy-forgery-inhibited-pattern data and the printout data, the process goes to S616. On the other hand, all the pages are separated by the copy-forgery-inhibited-pattern data and the printout data, the process goes to S612.

In a case where the copy-forgery-inhibited-pattern data and the printout data are separated, the copy-forgery-inhibited-pattern data which is common in all the pages is produced again at S612. Here, user names and passwords which the respective documents had before the connecting may be all combined or may be replaced by new user names and passwords. That is, the copy-forgery-inhibited-pattern (third image) into which the certification information containing the new user name and the new password is embedded may be embedded in place of the copy-forgery-inhibited-pattern for each page (that is, in place of the certification information which should have been embedded into each page originally).

Next, at S613, the old copy-forgery-inhibited-pattern data contained in each page is deleted. In addition, at S614 the old copy-forgery-inhibited-pattern data is replaced by the copy-forgery-inhibited-pattern data generated at S612.

Finally, at S615, data of the document replaced by the new copy-forgery-inhibited-pattern data (set to be combined with the new copy-forgery-inhibited-pattern data) are connected (that is, for example, data are put together into one, which is again saved in the HDD).

However, in a case where the copy-forgery-inhibited-pattern data and the printout data are partially combined, the processing is carried out as follows.

In this case, at S616, the certification data corresponding to all the pages are obtained from the certification information administration unit 135 and the copy-forgery-inhibited-pattern data containing the certification data are produced.

Next, at S617 a front cover is produced and the copy-forgery-inhibited-pattern data generated at S616 are combined to the data of the produced front page. That is, a front cover page which has combined the copy-forgery-inhibited-pattern data containing the certification data corresponding to all the pages is produced.

Next, at S618, the front cover page (data of the document as a front cover) produced at S617 and all of the data of the document indicated by a user at S602 are connected. For example, subsequent to the front cover page, data of the document in which the data of the documents (documents of a connection object) indicated by a user at S602 are arranged in order are produced. The produced data are put together into one, which is again saved in the HDD. It should be noted that the front cover page is a page printed prior to other pages (corresponding to the data of the document). Therefore, in this step, the front cover page is designed to be printed prior to the data of the document indicated by the user at S602.

It should be noted that in the present embodiment, the front cover page is produced to combine the copy-forgery-inhibited-pattern data containing the certification data of all the pages, but is not limited to this. For example, in a case where a certification data (for example, password) which can be an alternative to the certification data of all the pages is requested to a user and the input in response to the request is made from the user, a front cover page which has combined the copy-forgery-inhibited-pattern data containing the alternative certification data may be produced. In this case, to a user who copies "a print result obtained as a result of the present embodiment", a request of the alternative certification data is made for performing the copy. It should be noted that, in order for a copier to make only a request of the alternative certification data, a front cover page should be produced so that the information showing that "the alternative certification data can be an alternative to the certification data of all the pages" is contained (copy-forgery-inhibited-pattern data combined in the front cover page) without mentioning.

According to the above process flow, a user can connect data of the documents saved in the BOX (HDD) 125 of the image forming device 120 at a state of retaining the certification information without paying attention to the copy-forgery-inhibited-pattern data saved in the BOX. In consequence, also in regard to the document connected by a user, since the certification processing is required after the printing, the security of the document can be maintained.

Figure 7A:
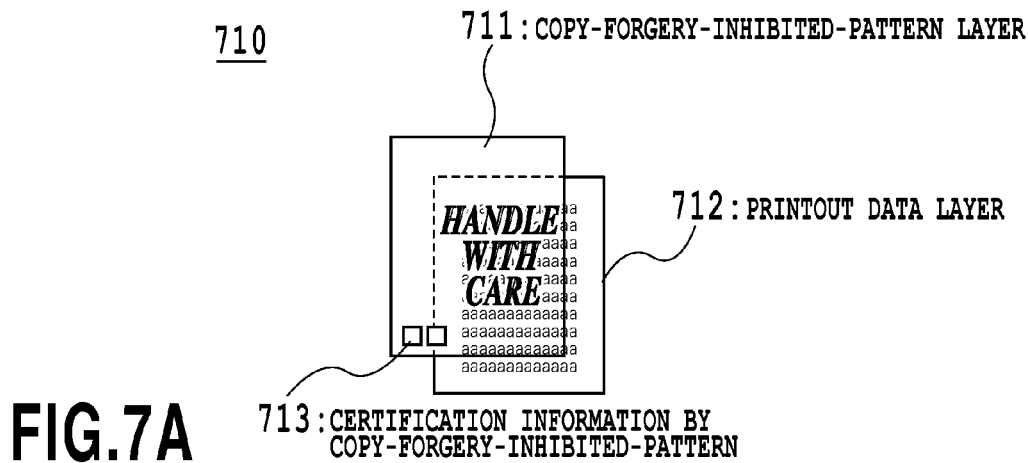
FIG. 7A is a diagram showing the data structure of a document in a copy-forgery-inhibited-pattern/print layer separation system.
Figure 7B:
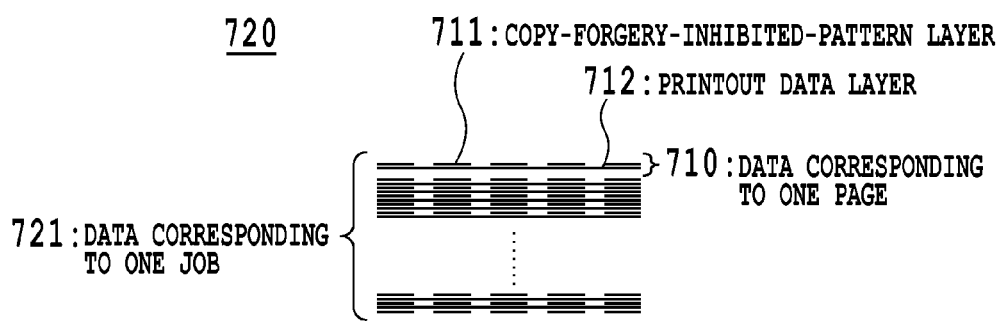
FIG. 7B is a diagram showing the data structure of a document in a copy-forgery-inhibited-pattern/print layer separation system.
Figure 7C:
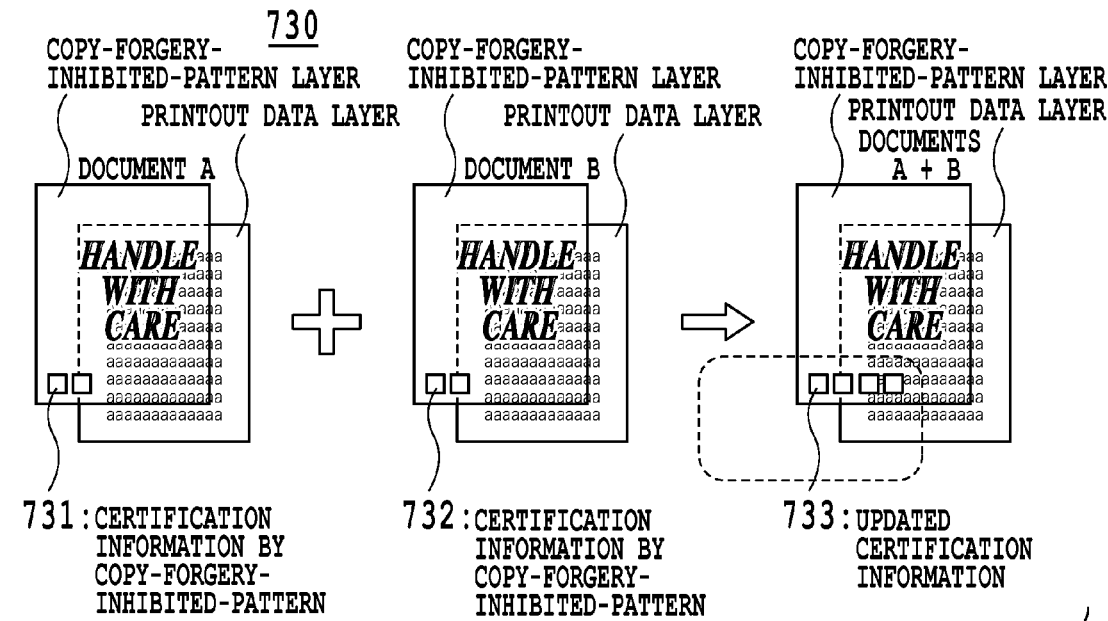
FIG. 7C is a diagram showing the data structure of a document in a copy-forgery-inhibited-pattern/print layer separation system.

FIGS. 7A, 7B and 7C exemplifies the document structure of a system for retaining copy-forgery-inhibited-pattern data and printout data in a separate state in the present embodiment.

Numeral 710 shows the construction of data corresponding to one page (FIG. 7B). As shown in FIG. 7A, each page is constructed of two layers of a copy-forgery-inhibited-pattern layer 711 and a printout data layer 712. On the copy-forgery-inhibited-pattern layer 711, the certification information for imposing copy restriction on a user is combined by encoding (713) or characters for alert are provided as watermarks. For the encoding of the certification information herein, the image processing technology described in Japanese Patent Laid-Open No. 2004-223854 by the present applicant can be used. A copy-forgery-inhibited-pattern pattern is usually constructed by a combination of large dots and small dots and at copying, the copy-forgery-inhibited-pattern pattern stands out. The above image processing technology is designed so as to be capable of adding information by shifting positions of dots constituting the copy-forgery-inhibited-pattern pattern according to a predetermined rule. This technology allows the additional information such as the certification information to be contained in the copy-forgery-inhibited-pattern data. That is, in the copy-forgery-inhibited-pattern of the present embodiment, information such as two-dimensional codes, bar codes and watermarks is contained. It should be noted that it is apparent for those skilled in the art that unless the words of "copy-forgery-inhibited-pattern" are included in claims, the invention according to the claim is not limited to the copy-forgery-inhibited-pattern (for example, regular two-dimensional codes such as QR code may be used).

The printout layer is printed on a paper medium by a regular toner of CMYK, but the copy-forgery-inhibited-pattern layer is not limited to use of the toner of CMYK and may be limited to use of a clear toner or a YELLOW toner with poor visibility. By providing the copy-forgery-inhibited-pattern by a layer different from the printout data layer, it is possible to reproduce only the copy-forgery-inhibited-pattern layer of 711 upon connecting jobs. In consequence, the certification information can be updated without affecting the printout data.

Numeral 720 shows the construction of data of documents formed of pages each having the construction of 710 and shows that each page is constructed of two layers.

Numeral 730 in FIG. 7C exemplifies the method of handling the certification information of jobs after the connecting in a case of connecting jobs of a layer separation type with each other.

By referring to the certification information 731 and 732 for each document at S612 as mentioned before, new certification information 733 is generated and on the other hand, the old certification information is deleted at S613. The updated certification information shown at 733 is combined to all pages of the document after the connecting (S614 and S615). Thereby, the security similar to that before the connecting can be secured.

Figure 8A:
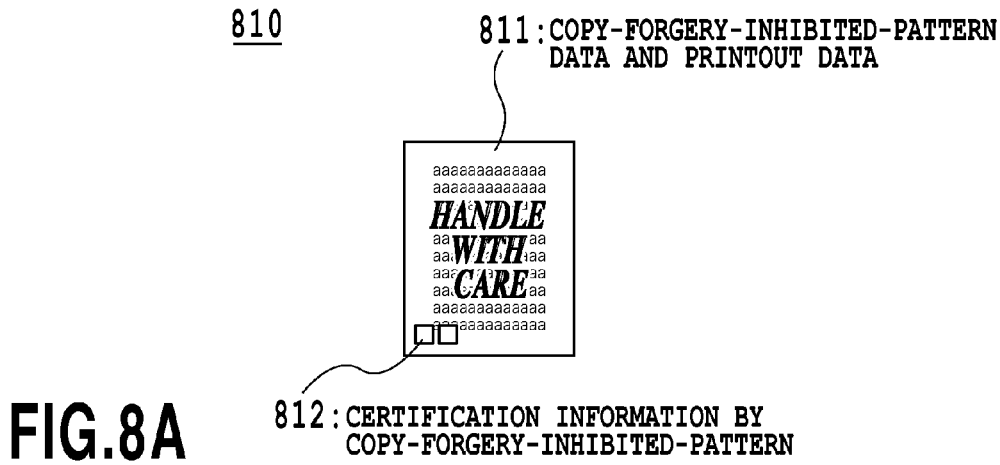
FIG. 8A is a diagram showing the data structure of a document in a copy-forgery-inhibited-pattern/print layer unifying system.
Figure 8B:
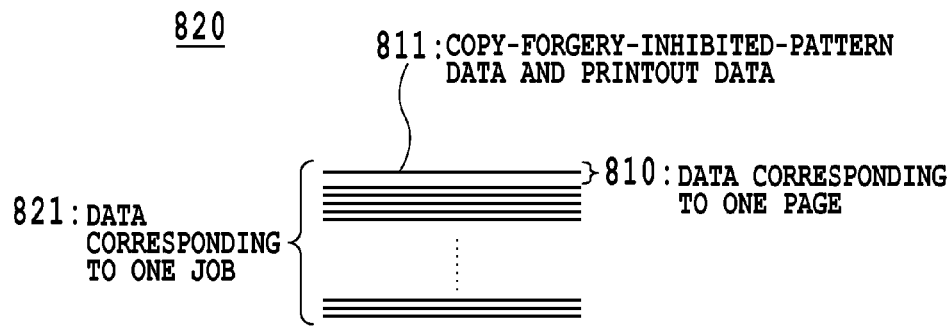
FIG. 8B is a diagram showing the data structure of a document in a copy-forgery-inhibited-pattern/print layer unifying system.
Figure 8C:
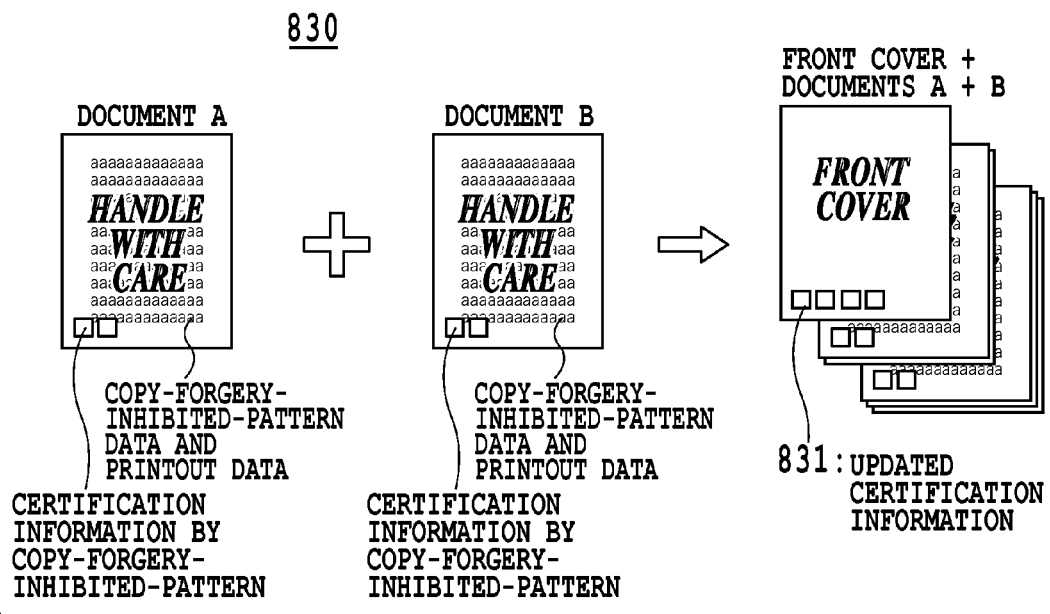
FIG. 8C is a diagram showing the data structure of a document in a copy-forgery-inhibited-pattern/print layer unifying system.

FIGS. 8A, 8B and 8C exemplifies the data structure of a document in which copy-forgery-inhibited-pattern data and printout data are combined in the present embodiment.

Numeral 810 shown in FIG. 8B shows the construction of data corresponding to one page, but this data structure is different from that of 710, in which print data and copy-forgery-inhibited-pattern data are recorded in the same layer (811) and the certification information 812 by the copy-forgery-inhibited-pattern (FIG. 8A) is united with the printout data. Therefore, rewriting the certification information contained in the copy-forgery-inhibited-pattern data also causes destruction of the printout data as the base layer, thereby generating image degradation. Therefore, as shown in 830 of FIG. 8C, all the certification information contained in the data of documents before the connecting is put together to produce new certification information (FIG. 6: S616), which is combined with a front cover to be newly produced (FIG. 6: S617).

Numeral 831 of FIG. 8C shows the new certification information combined in the front cover page. The connected document is constructed of a front cover, a document A and a document B, and the certification information part of each of the document A and the document B (printout data with which copy-forgery-inhibited-pattern data is combined) is left in an original state without being edited. In consequence, the certification information can be maintained without causing the image degradation.

Until here, some embodiments of the present invention are in detail explained with reference to FIGS. 1 to 8.

By using the aforementioned method, the data of the documents with the certification information by the copy-forgery-inhibited-pattern data can be connected without degrading the original image. In addition, even after the connecting, the certification information can be maintained as the data of one document.

Other Embodiment

It should be noted that an object of the present invention can be also achieved by reading out and carrying out a program code from a memory medium storing the program code for realizing the order of the flow chart shown in the aforementioned embodiment, with a computer (CPU or MPU) of a system or a device. In this case, the program code itself read out from the memory medium forces the computer to realize the function of the aforementioned embodiment. Therefore, the program code and the computer-readable memory medium which stores/records the program code also constitute one aspect in the present invention.

Examples of the memory medium for supplying the program code may include a floppy (registered trade mark) disc, a hard disc, an optical disc, an optical magnetic disc, a CD-ROM, a CD-R, a magnetic tape, an involatile memory card and a ROM.

In addition, the function of the aforementioned embodiment is achieved by executing the program read by the computer. Further, the execution of the program also includes a case where an OS working on the computer carries out a part or all of the actual processing based upon an indication of the program.

Further, the function of the aforementioned embodiment may be realized also by a function expanding board inserted into the computer or a function expanding unit connected to the computer. In this case, first, the program read out from the memory medium is written in a memory equipped in the function expanding board inserted into the computer or the function expanding unit connected to the computer. Thereafter, the CPU or the like equipped in the function expanding board or in the function expanding unit carries out a part or all of the actual processing based upon an indication of the program. The function of the aforementioned embodiment is realized also by the processing by such function expanding board or function expanding unit.

While the present invention has been discussed with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-315036 filed Dec. 5, 2007, which is hereby incorporated by reference herein in its entirety.

What is claimed is:

1. A device comprising:
   a connecting unit that forms a connected document by connecting a first document, on which is embedded first certification information as a coded image for permitting copying of the first document, with a second document, on which is embedded second certification information as a coded image for permitting copying of the second document,
   wherein said connecting unit, during the connecting, inserts a document on which the first certification information and the second certification information are embedded, as a head page in the connected document.

2. A method comprising:
   a connecting step of forming a connected document by connecting a first document, on which is embedded first certification information as a coded image for permitting copying of the first document, with a second document, on which is embedded second certification information as a coded image for permitting copying of the second document,
   wherein in said connecting step, during the connecting, a document on which the first certification information and the second certification information are embedded, is inserted as a head page in the connected document.

* * * * *